United States Patent [19]
Bates et al.

[11] Patent Number: 5,171,968
[45] Date of Patent: Dec. 15, 1992

[54] LOW POROSITY WELDING ELECTRODE

[75] Inventors: Thomas O. Bates; Robert A. Bishel; David B. O'Donnell, all of Huntington, W. Va.

[73] Assignee: Inco Alloys International, Inc., Huntington, W. Va.

[21] Appl. No.: 767,738

[22] Filed: Sep. 30, 1991

[51] Int. Cl.⁵ .............................................. B23K 35/22
[52] U.S. Cl. .................................................. 219/146.22
[58] Field of Search .............. 219/137, 146.24, 146.23, 219/146.41, 146.22

[56] References Cited

U.S. PATENT DOCUMENTS

| | | | |
|---|---|---|---|
| 3,770,427 | 11/1973 | Petersen | 219/137 WM |
| 3,778,588 | 12/1973 | Bishel | 219/137 WM |
| 3,919,519 | 11/1975 | Petersen | 219/137 WM |
| 4,010,309 | 3/1977 | Petersen | 219/146.23 |
| 4,213,026 | 7/1980 | Duvall et al. | 219/146.23 |

FOREIGN PATENT DOCUMENTS 54-121247  9/1979  Japan ............................ 219/146.24

Primary Examiner—Clifford C. Shaw
Attorney, Agent, or Firm—Blake T. Biederman; Edward A. Steen

[57] ABSTRACT

The invention provides a welding electrode useful for reducing nitrogen porosity in a weld. A metallic base having 1.5 to 6 weight percent titanium, balance essentially nickel is used. The resulting deposit has less than 0.5 weight percent titanium to ensure close match of tolerances. A flux is used in combination with the metallic base to control arc behavior, atmosphere content and slag characteristics.

11 Claims, No Drawings

LOW POROSITY WELDING ELECTRODE

TECHNICAL FIELD

The invention relates to a welding electrode for welding low porosity welds, and more particularly, to a welding electrode for nickel steels used at temperatures as low as −160° C.

BACKGROUND OF THE ART

Porosity has long been a problem responsible for reducing integrity of welds. Porosity is especially a problem when welding in an overhead welding position. During normal welding operations, large gas bubbles typically rise through liquid metal to escape the weld. However, during overhead welding operations, bubbles do not escape a weld by rising because upward movement is prevented by the base metal. Overhead welding requires a welding electrode that entraps an extremely low amount of gases. Furthermore, the slag must prevent excessive dripping of weld metal. An example of a flux specifically adapted for welding in the overhead position is disclosed by T. O. Bates in U.S. Pat. No. 4,940,882.

Using a flux to provide useful overhead welding conditions is not useful for every welding condition. For example with, some alloys which require a close match, it may not be practical to adjust the flux to solve porosity problems and maintain a desired weld deposit composition. There exists a need for a base metal that will facilitate overhead welding when using a variety of fluxes.

For example, the American Welding Society has developed stringent standards for ENiCrMo-6 welding electrodes. Minimum requirements for weld deposits produced from ENiCrMo-6 welding electrodes have been an ultimate tensile strength of 620 MPa and a corresponding elongation of at least 35, three fissures not greater than 0.24 cm during bending and a 33.9 Joule Charpy V-Notch strength at −160° C. with a 0.09 cm minimum mean elongation. Composition of weld deposit requirements arising from welding with ENiCrMo-6 electrodes are given in Table 1 below in weight percent.

TABLE 1

| Element | Min. | Aim | Max. |
|---|---|---|---|
| C | — | 0.08 | 0.10 |
| Mn | 2.0 | 2.5 | 4.0 |
| Fe | | 4.0N | 10.0 |
| S | | | 0.02 |
| Si | | 0.7N | 1.0 |
| Cu | | | 0.50 |
| Ni | 55.0N | 70.0N | |
| Cr | 12.0 | 14.0N | 17.0 |
| Mo | 5.0 | 7.0N | 9.0 |
| Cb + Ta | 0.5 | 1.6 | 2.0 |
| W | 1.0 | 1.6 | 2.0 |
| P | | | 0.03 |
| Others | | 0.35N | 0.50 |

N = Nominal

Commercially available ENiCrMo-6 welding electrodes have been used to weld nickel steel used for cryogenic applications. Typically, ENiCrMo-6 welding electrodes have used an essentially pure nickel core wire such as nickel alloy 200 surrounded by a flux. The problem with commercially available welding electrodes has been marginal out-of-position operability and gross porosity when welding in the overhead position.

It is the object of this invention to produce a base alloy for facilitating welding of close tolerance alloys with reduced porosity in the overhead position.

It is a further object of this invention to produce a nickel steel welding electrode with good out-of-position welding operability.

It is a further object of this invention to produce a welding electrode that reduces porosity when welding in the overhead position.

SUMMARY OF THE INVENTION

The invention provides a welding electrode useful for reducing nitrogen porosity in a weld. A metallic base having 1.5 to 6 weight percent titanium, balance essentially nickel is used. The resulting deposit has less than 0.5 weight percent titanium to ensure close match of tolerances. A flux is used in combination with the metallic base to control arc behavior, atmosphere content and slag characteristics.

DESCRIPTION OF PREFERRED EMBODIMENT

An experimental flux for ENiCrM1-6 welding electrodes having a relatively large amount of aluminum (a strong deoxidizer) was found to have porosity problems when welding in the overhead position. It has been discovered that welding with 1.5 to 6 weight percent titanium added to a nickel base provides for improved porosity free welding in the overhead position. The metallic titanium is believed to act as a titanium getter forming nitrogen-containing compounds such as titanium nitride to eliminate porosity. Furthermore, titanium has been found to facilitate out-of-position welding and AC weldability. A specific flux designed for welding nickel steels in the overhead position to stringent ENiCrMo-6 standards has also been developed. Compositions of broad, intermediate, narrow and nominal compositions in parts by weight and core wire composition in weight percent are given below in Table 2.

TABLE 2

| | Broad | Intermediate | Narrow | Nominal |
|---|---|---|---|---|
| Flux | | | | |
| Metal Carbonate | 5–40 | 5–30 | 5–20 | 10 (Calcium Carbonate) |
| Rutile + Zirconia | 5–40 | 5–30 | 5–20 | 14 (Rutile) |
| Cryolite | 0–30 | 1–30 | 5–20 | 7 |
| Alkaline Earth Fluoride | | 0–10 | 0.5–6 | 2 (Calcium Fluoride) |
| Ruflux P | | 0–15 | 0.75–7.5 | 3 |
| Chromium Powder | 0–40 | 15–40 | 20–35 | 26 |
| Mn | | 0–15 | 2–12 | 7 |
| Dolomite | | 0–20 | 1–10 | 5 |
| Niobium Powder | 0–7 | .75–7 | | 3.5 (FeNb) |
| Molybdenum Powder | 0–15 | 2–15 | 5–15 | 11.5 |
| Tungsten Powder | 0–5 | 1–5 | 1–4 | 2.5 |
| Magnetite | 1–15 | 1–15 | 3–10 | 7 |
| Bentonite | | 0–10 | 1–8 | 3 |
| Natrosol Binder | | 0–5 | 0.5–3 | 1 |
| Sodium Silicate | | 0–40 | 5–25 | 14 |
| Potassium Silicate | | 0–40 | 5–25 | 14 |
| Water | | 0–10 | 0–5 | 3 |
| Lithium Sodium Polysilicate | | 0–10 | 0.25–1 | 0.5 |
| Core Wire | | | | |
| Nickel | Balance | Balance | Balance | Balance |

TABLE 2-continued

|  | Broad | Intermediate | Narrow | Nominal |
|---|---|---|---|---|
| Titanium | 1.5–6 | 1.5–5 | 2–5 | 3 or 4 |

Flux of the invention includes metal carbonate selected from the group consisting of calcium carbonate, barium carbonate, manganese carbonate and strontium carbonate for control of flux solidification and to provide a gas shield during welding operations. Preferably calcium carbonate is used having a combination of coarse and fine particles to optimize baking characteristics. Most preferably, dolomite [$MgCa(CO_3)_2$] may also be used for gas shielding. Rutile and zirconia act as fillers and control slag freezing. Cryolite and alkaline metal fluorides selected from the group consisting of calcium fluoride, barium fluoride and strontium fluoride may be added for increasing slag cleaning and slag fluidity. Ruflux ™ P (essentially 73–77% $TiO_2$, 19–21% $K_2O$ and about 1% $ZrO_2$) is preferably added for increased arc stability.

Chromium, manganese, niobium, molybdenum and tungsten or alloys thereof are added as powders to the flux for direct deposition into the weld deposit. It is recognized that chromium, manganese, niobium, molybdenum and tungsten may also be added through the core wire. Levels of chromium, manganese, molybdenum and tungsten are controlled to achieve desired corrosion resistance and mechanical properties (especially at cryogenic temperatures). Molybdenum and tungsten are preferably added by using fine powder less than 0.066 mm mesh size to ensure complete dissolution of molybdenum and tungsten into the weld deposit. It is recognized that it may be possible to add larger particles of molybdenum and tungsten if the ingredients are added as alloys having a lower melting temperature.

Magnitite acts to limit silicon pickup in the weld deposit. Limiting silicon is important, since silicon negatively affects mechanical properties (especially properties at cryogenic temperatures).

Bentonite is advantageously added to provide strength after baking of the flux. In addition, Natrosol ™ brand hydroxyethylcellulose (HEC) is advantageously added as an extrusion aid and to provide green strength after extrusion of flux onto a core wire.

Advantageously, a silicate binder is used to bond the flux to a core wire. Most advantageously, a combination of sodium, potassium and lithium silicate blended with water is used. A small amount of lithium silicate has been found to reduce silicon pick up in the weld deposit by acting as a sodium silicate substitute with only a small decrease in green strength. Manufacturer's specification of sodium silicate is 31.3–32.5% $SiO_2$, 10.5–11.5% $Na_2O$ and 2.83–2.98% $SiO_2+Na_2O$, viscosity at 20° C. of 780–1140 centipoise and specific gravity at 20° C. of about 1.59–1.67 g/cm³. Manufacturer's specification for potassium silicate is 11.0–13.0% $K_2O$, 25.75–26.75% $SiO_2$, 2.05–2.15% $SiO_2+K_2O$, specific gravity at 20° C. of 1.37–1.40 g/cm³ and a viscosity at 20° C. of 695–1395 centipoise. In addition, lithium sodium polysilicate solution had manufacturer's specifications of 1.7–1.9% $Li_2O$, 1.1–1.3% $Na_2O$, 17.8–22.2% $SiO_2$, pH of 10.6–10.8 and specific gravity at 25° C. of 1.19 g/cm³.

Addition of titanium to a nickel-base core wire has been found to eliminate porosity in the overhead position, increase out-of-position weldability and increase AC weldability. It is recognized that the titanium addition to a nickel-base alloy is applicable to both coated welding electrodes and flux-cored electrodes. In addition, titanium added to the core wire is only minimally transferred into the weld deposit which ensures optimal mechanical properties. Most preferably, less than 0.5 wt. % titanium is transferred to the weld deposit. Wires of smaller diameter accept a higher weight percent titanium than wires of a larger diameter. For example, core wires having most advantageous amounts of titanium are listed below in Table 3.

TABLE 3

| Core Diameter | | Titanium | Flux Diameter | |
|---|---|---|---|---|
| (in.) | (cm) | (wt. %) | (in.) | (cm) |
| 3/32 | 0.24 | 4 | 0.180 | 0.457 |
| ⅛ | 0.32 | 4 | 0.240 | 0.610 |
| 5/32 | 0.40 | 3 | 0.300 | 0.762 |
| 3/16 | 0.48 | 3 | 0.375 | 0.952 |

Titanium is preferably added to nickel with nickel alloy 209 (4 wt. % Ti) and nickel alloy 208 (3 wt. % Ti). Chemical analysis of various flux coated welding electrodes produced using the nominal composition of Table 2 is provided below in Table 4.

TABLE 4

| Sample No. | Wire Dia. (cm) | Outer Die Size (cm) | C | Mn | Fe | S | Si | Cu | Ni | Cr | Mo | Cb | W | P | Other Elements |
|---|---|---|---|---|---|---|---|---|---|---|---|---|---|---|---|
| 1 | .236 | .457 | 0.033 | 2.991 | 4.30 | 0.007 | 0.585 | 0.01 | 65.19 | 15.80 | 7.81 | 0.94 | 1.99 | 0.005 | .322 |
| 2 | .256 | .457 | 0.029 | 2.785 | 3.67 | 0.005 | 0.777 | 0.01 | 68.35 | 14.79 | 6.59 | 0.92 | 1.56 | 0.005 | .435 |
| 3 | .318 | .610 | 0.106 | 3.223 | 3.21 | 0.005 | 0.804 | 0.00 | 64.26 | 16.14 | 7.91 | 1.92 | 1.88 | 0.004 | .396 |
| 4 | .318 | .610 | 0.040 | 3.260 | 2.48 | 0.005 | 0.780 | 0.00 | 68.62 | 14.29 | 7.30 | 1.15 | 1.71 | 0.004 | .214 |
| 5 | .396 | .762 | 0.035 | 2.724 | 1.95 | 0.007 | 0.397 | 0.02 | 72.15 | 13.49 | 6.42 | 0.82 | 1.76 | 0.007 | .148 |
| 6 | .396 | .762 | 0.033 | 2.631 | 2.13 | 0.007 | 0.349 | 0.01 | 70.73 | 14.00 | 7.00 | 0.69 | 1.93 | 0.008 | .147 |
| 7 | .475 | .972 | 0.035 | 2.481 | 4.03 | 0.007 | 0.542 | 0.00 | 68.57 | 13.60 | 7.76 | 0.77 | 1.91 | 0.006 | .192 |
| 8 | .475 | .952 | 0.084 | 2.449 | 3.93 | 0.007 | 0.635 | 0.01 | 69.30 | 13.53 | 7.09 | 0.79 | 1.87 | 0.005 | .288 |

The above compositions were within the desired chemical limits of Table 1 and are advantageous for welding nickel steels to be used at cryogenic temperatures. Typical room temperature mechanical properties of deposits produced by welding rods of the invention are listed below in Table 5.

TABLE 5

| Core Wire Size (cm) | Yield Strength (MPa) | Tensile Strength (MPa) | Percent Elongation |
|---|---|---|---|
| .236 | 450–480 | 650–760 | 35–40 |
| .318 | 380–450 | 620–690 | 35–40 |
| .396 | 340–410 | 620–690 | 35–40 |

The welding electrode of the invention provided porosity free welding in the overhead position, with improved operability and improved AC stability. The large diameter 3/16 in. or 0.476 cm diameter core wire when coated with the flux of the invention was able to achieve the desired chemical composition. However, the 0.476 cm core wire had lower operability than smaller diameter coated electrode.

While in accordance with the provisions of the statute, there is illustrated and described herein specific embodiments of the invention, those skilled in the art will understand that changes may be made in the form of the invention covered by the claims and that certain features of the invention may sometimes be used to advantage without a corresponding use of the other features.

The embodiments of the invention in which an exclusive property or privilege is claimed are defined as follows.

1. A welding electrode useful for reducing nitrogen porosity in a weld consisting essentially of:
   a metallic base, said metallic base consisting essentially of 1.5 to 6 weight percent titanium and balance essentially nickel for welding with less than 0.5 wt. % titanium pickup in a weld deposit;
   a flux for controlling arc behavior, atmosphere content and slag characteristics, said flux including about 5 to 40 parts by weight alkaline metal carbonate, about 5 to 40 parts by weight rutile plus zirconia and about 0 to 30 parts by weight cryolite; and
   a means for holding said flux proximate said metallic base.

2. The welding electrode of claim 1 wherein said metallic base is a core wire and wherein said means for holding said flux is a silicate binder.

3. The welding electrode of claim 1 wherein said metallic base is a tube.

4. A welding electrode useful for welding nickel steels consisting essentially of a nickel-base core wire having in weight percent about 1.5 to 6 titanium, a flux including in parts by weight about 5 to 40 alkaline metal carbonate, about 5 to 40 rutile plus zirconia, about 0 to 30 cryolite, about 0 to 40 chromium powder, about 0 to 7 niobium powder, about 0 to 15 molybdenum powder, about 0 to 5 tungsten powder, 1 to 15 magnetite for limiting silicon pickup and a binder for holding said flux to said core wire.

5. The welding electrode of claim 4 including about 0.75 to 7 niobium powder, about 2 to 15 molybdenum powder and about 1 to 5 tungsten powder.

6. The welding electrode of claim 4 including a silicate binder.

7. The welding electrode of claim 4 including an extrusion aid.

8. A welding electrode useful for welding nickel steels consisting essentially of a nickel-base core wire having in weight percent about 1.5 to 5 titanium, a flux including in parts by weight about 5 to 30 alkaline metal carbonate, about 5 to 30 rutile plus zirconia, about 1 to 30 cryolite, about 0 to 10 alkaline earth fluoride, about 0 to 15 arc stabilizer, about 15 to 40 chromium powder, about 0 to 15 manganese powder, about 0 to 20 dolomite, about 0.75 to 7 niobium powder, about 1 to 15 molybdenum powder, about 1 to 5 tungsten powder, about 1 to 15 magnetite, about 0 to 10 bentonite, about 0 to 5 hydroxyethylcellulose, and a binder containing about 0 to 40 sodium silicate, about 0 to 40 potassium silicate, about 0 to 10 lithium sodium polysilicate and about 0 to 10 water and said arc stabilizer having in weight percent about 73–77% $TiO_2$, 19–21% $K_2O$ and about 1% $ZrO_2$.

9. The welding electrode of claim 8 wherein said alkaline metal carbonate is calcium carbonate, said alkaline metal fluoride is calcium fluoride and said rutile plus zirconia is at least 90% rutile.

10. The welding electrode of claim 8 wherein said molybdenum and tungsten powders have a size less than a sieve opening size of 0.066 mm.

11. The welding electrode of claim 8 wherein lithium silicate is between 0.25 and 1.0 parts by weight.

* * * * *